2,976,250
Patented Mar. 21, 1961

2,976,250
MATTE-SUSPENSIONS

Raymond J. Walford, Binghamton, N.Y., assignor to General Aniline & Film Corporation, New York, N.Y., a corporation of Delaware No Drawing. Filed Feb. 17, 1956, Ser. No. 566,076

5 Claims. (Cl. 252—313)

This invention relates to a method of forming stable dispersions of silicon dioxide particles in aqueous media which are free from colloidal carriers.

Matting agents are used in photographic materials for a variety of purposes such as reducing static, stickiness, and tackiness or to provide a surface with a slight tooth which is scarcely perceptible to the eye but has sufficient grit to permit retouching or writing for the identification of film. Among the most useful matting agents known to the photographic art is silicon dioxide, commonly referred to as silica. However, dispersions of silicon dioxide in a colloidal carrier such as gelatin, even in the presence of a dispersing agent such as saponin or synthetic surfactants tend to agglomerate, particularly when used in the relatively high concentrations which are necessary to provide a writing surface. These agglomerated dispersions are very difficult to coat the resulting coatings containing the agglomerated silicon dioxide have rough and coarse surfaces which are commercially unacceptable because they distort the picture and have the tendency to scratch other film surfaces with which they are in contact when packaged or when stored after exposure and processing.

It has also been attempted to disperse the silica in water by the use of synthetic surface active agents, and these attempts met with partial success insofar as the dispersion was concerned. However, the dispersion solutions obtained in this matter have the undesirable tendency to settle and cake after relatively short periods of storage. Once such a dispersion has settled and caked, it is not only unfit for use in photographic materials but the caked material can no longer be removed from its container. Frequently, removal is only possible by the use of a chisel. This means that not only the silica but also the container, for instance, a ceramic crock, is a total loss.

It is, therefore, an object of the instant invention to provide a stable silica dispersion which can be stored for extended periods of time without settling and caking and which, when incorporated into a photographic colloidal carrier material, can be used successfully for the preparation of matted photographic layers.

Other objects will appear hereinafter.

I have found that the above objects are accomplished by dispersing the silica powder in an aqueous solution containing a cationic surface active agent characterized by the following general formula:

wherein $R_1$ is a β-hydroxyethyl radical, $R_2$ and $R_3$ are low molecular weight alkyl radicals, e.g., methyl, ethyl, propyl and isopropyl, and in which $R_2$ and $R_3$ may be alike or different, $R_4$ is a long chain alkyl radical of from 14 to 18 carbon atoms, e.g., tetradecyl (myristyl), pentadecyl, hexadecyl(cetyl), heptadecyl and octadecyl (stearyl), and X is a halide, e.g., chloride or bromide.

The following quaternary ammonium salts are illustrative of the cationic surfactants which can be used to disperse the silica in accordance with this invention:

(β-Hydroxyethyl)dimethylmyristyl ammonium chloride
(β-Hydroxyethyl)diethylmyristyl ammonium chloride
(β-hydroxyethyl)dimethylcetyl ammonium bromide
(β-Hydroxyethyl)dimethylcetyl ammonium chloride
(β-Hydroxyethyl)diethylcetyl ammonium chloride
(β-Hydroxyethyl)diethylcetyl ammonium bromide
(β-Hydroxyethyl)methylethylcetyl ammonium chloride
(β-Hydroxyethyl)dipropylcetyl ammonium chloride
(β-Hydroxyethyl)di-isopropylcetyl ammonium chloride
(β-Hydroxyethyl)di-isopropylcetyl ammonium bromide
(β-Hydroxyethyl)dimethylstearyl ammonium bromide
(β-Hydroxyethyl)diethylstearyl ammonium chloride
(β-Hydroxyethyl)ethylmethylstearyl ammonium chloride
(β-Hydroxyethyl)dipropylstearyl ammonium chloride
(β-Hydroxyethyl)di-isopropylstearyl ammonium chloride The foregoing quaternary ammonium salts are readily prepared by reacting a tertiary amine containing one β-hydroxyethyl group and two lower alkyl substituents with a molecular equivalent or a slight excess of a long chain alkyl halide at room temperature or at slightly elevated temperatures which usually need not exceed 80° C. The quaternary ammonium salt precipitates and can be purified by washing with acetone.

For the dispersion of the silica, the quaternary ammonium salts are dissolved in water to form solutions containing from 0.05 to 5 grams per liter. Solutions containing from 0.2 to 1 gram are most effective. The solid silica is added to the solution with vigorous stirring in concentrations ranging from 10 grams to 200 grams per liter and vigorous stirring is continued at room temperature for 5 to 30 minutes. It is also proper to add the solution of the quaternary ammonium salt with stirring to a previously prepared dispersion of silica in water. The silica dispersions obtained can be stored for several months without caking and without noticeable settling, in spite of the fact that the silica is present in the form of discrete particles.

The silica employed is a powder containing less than 0.1 percent of impurities such as ferric oxide or titanium oxide although it may contain more than one percent of moisture. The silica powder has a particle size ranging from about 1 to 10 microns, with the average particle size being on the order of 3 to 4 microns. The silica powder is prepared by the acidification of a solution of alkali silicate followed by washing with water. Alternatively, the silica having the required particle size can be prepared by the vapor hydrolysis of silicon compounds in a hot gaseous environment.

The stable silica dispersions obtained and stabilized through the presence of the quaternary ammonium salts are subsequently added to gelatinous solutions or dispersions of the type used in the photographic art which include gelatinous silver halide emulsions as well as gelatinous emulsions for the preparation of surface coats which are coated over the silver halide emulsion. The gelatin concentrations used are those characteristic for the contemplated operation. For instance, the gelatin concentration of the emulsions ranges from 2 to 12 percent by weight, whereas the concentration of the gelatin dispersion used for the surface coating ranges from 0.5 to 5 percent by weight. The amount of quaternary ammonium salt as based on the amount of gelatin in the surface coating, varies from .2 to 6 cc. of a 5 percent solution per kilogram of liquid silver halide emulsion used in the preparation of light sensitive materials. When used in the surface layer, a range of from 3 cc. to 17.5 cc. per kilogram of gelatin used in the preparation of the surface coating has been found satisfactory. In terms of emulsion, either containing the silica or an emulsion being overcoated with a gelatinous matting layer, the suitable amounts range from .13 cc. to 4.75 cc. per 10 kilogram of emulsion.

It has already been proposed to add quaternary ammonium salts to photographic materials as supersensitizers or in order to minimize the formation of color fog. The amounts needed for these purposes are not only greatly in excess of those needed for the dispersion of silicon dioxide but cause also side effects which, in many instances, are undesirable.

The main advantage of the use of the specific quaternary ammonium salts in the specific range of concentration, is their ability to provide fluocculent silicon dioxide-water suspension without agglomeration of the particles. It is believed that this is due to the electrokinetic characteristics of the suspension and that the matte silica particles are discharged and flocculate without formation of aggregate particles.

My invention will be illustrated more fully by reference to the following examples which are to be considered illustrative only without limiting the scope of the invention.

*Example I*

Fifty grams of silica powder commercially available under the trade name of "Davison Matting Agent" having an average median size of from 1 to 5 microns and an average particle size of 4 microns are added with stirring to 1 liter of water. 5 milliliters of a 5 percent by weight solution of (β-hydroxyethyl)diethylcetyl ammonium chloride are added with continued stirring. A suspension is obtained in which the matte particles are flocculated without agglomeration. The suspension of silica in water was entirely stable and did not show any noticeable precipitation or agglomeration of the dispersed particles, when stored for more than three months.

*Example II*

Sixty milliliters of the silica dispersion of Example I are added to 1 kilogram of a gelatino silver halide emulsion containing about 70 grams of gelatin and 50 grams of silver bromoiodide. The resulting emulsion is coated on a cellulose ester film base and dried. The resulting layer has a matte surface with uniformly distributed particles. It provides sufficient smoothness in the surface to permit writing with a pencil but does not appear rough to the touch.

*Example III*

120 milliliters of the silica dispersion obtained in accordance with Example I were added to 1 kilogram of a 2 percent by weight gelatin solution. The gelatin solution thus obtained contains the matte suspension and is coated over a regular light sensitive gelatin, silver halide emulsion which had previously been coated onto a cellulose acetate film base. After drying, the film obtained has a matte surface with uniformly distributed silica particles which appears smooth to the touch but permits writing with a pencil.

*Example IV*

Eighty grams of a silicon powder having an average particle size of 3 microns are slowly added with stirring to 1 liter of water containing 0.5 gram of (β-hydroxyethyl)dimethylcetyl ammonium chloride. A suspension of silica in water is obtained which remains stable without settling of silica when stored for more than three months.

*Example V*

Six milliliters of a 5 percent by weight solution of (β-hydroxyethyl)diethyloctadecyl ammonium chloride is added to 1 liter of a 4 percent by weight suspension of silicon dioxide (average particle size, 4 microns) in water. The stabilized suspension in which the matte particles flocculate without agglomeration can be stored without settling or caking for periods exceeding three months.

Various modifications of the invention will occur to persons skilled in the art. For example, the cellulose ester supports described in the examples may be replaced by paper or glass supports. Similarly, silver chloride emulsions may be used in place of the silver bromoiodide emulsions illustrated in the examples. I, therefore, do not intend to be limited in the patent granted except as necessitated by the appended claims.

I claim:

1. A stabilized suspension of silicon dioxide in water consisting essentially of water, silicon dioxide having a particle size ranging from 1 to 10 microns and a quaternary ammonium salt characterized by the following general formula:

wherein $R_1$ is a β-hydroxethyl radical, $R_2$ and $R_3$ are low molecular weight alkyl radicals having not more than 3 carbon atoms, $R_4$ is a long chain alkyl radical of from 14 to 18 carbon atoms, and X is a halide selected from the class consisting of chloride and bromide, the amount of silica being from 10 to 200 grams per liter and the amount of the quaternary ammonium salt being from 0.1 to 5 grams per liter.

2. A stabilized suspension of silicon dioxide in water according to claim 1 wherein said silicon dioxide has an average particle size of from 3 to 4 microns.

3. A stabilized suspension of silicon dioxide in water according to claim 1 wherein said quaternary ammonium salt is (β-hydroxyethyl)diethylcetyl ammonium chloride.

4. A stabilized suspension of silicon dioxide in water according to claim 1 wherein said quaternary ammonium salt is (β-hydroxyethyl)dimethylcetyl ammonium chloride.

5. A stabilized suspension of silicon dioxide in water according to claim 1 wherein said quaternary ammonium salt is (β-hydroxyethyl)diethyloctadecyl ammonium chloride.

References Cited in the file of this patent

UNITED STATES PATENTS

| | | |
|---|---|---|
| 2,295,505 | Shelton | Sept. 8, 1942 |
| 2,443,512 | Powers | July 15, 1948 |
| 2,561,304 | Hazel | July 17, 1951 |
| 2,692,863 | Iler | Oct. 26, 1954 |
| 2,819,228 | Dell | Jan. 7, 1958 |

OTHER REFERENCES

"Surface Active Agents," Schwartz and Perry, 1949, Interscience Publ. Inc., N.Y., pp. 162-3.